United States Patent
Vemury

(10) Patent No.: US 11,924,349 B2
(45) Date of Patent: *Mar. 5, 2024

(54) THIRD PARTY BIOMETRIC HOMOMORPHIC ENCRYPTION MATCHING FOR PRIVACY PROTECTION

(71) Applicant: The Government of the United States of America, as represented by the Secretary of Homeland Security, Washington, DC (US)

(72) Inventor: Arun Vemury, North Bethesda, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,388

(22) Filed: Dec. 13, 2022

(65) Prior Publication Data

US 2023/0403157 A1 Dec. 14, 2023

Related U.S. Application Data

(60) Provisional application No. 63/350,684, filed on Jun. 9, 2022.

(51) Int. Cl.
*G06F 21/00* (2013.01)
*H04L 9/00* (2022.01)
*H04L 9/32* (2006.01)

(52) U.S. Cl.
CPC ............ *H04L 9/3231* (2013.01); *H04L 9/008* (2013.01)

(58) Field of Classification Search
CPC .............................. H04L 9/008; H04L 9/3231
See application file for complete search history.

(56) References Cited

U.S. PATENT DOCUMENTS 9,325,707 B2    4/2016   Ketchantang
9,900,147 B2 *  2/2018   Laine .................... H04L 9/0618
(Continued)

FOREIGN PATENT DOCUMENTS

WO    2019112650 A1   6/2019
WO    20222201411 A1  9/2022

OTHER PUBLICATIONS

Marta Gomez-Barrero, Emanuele Maiorana, Javier Galbally, Patrizio Campisi, Julian Fierrez, Multi-biometric template protection based on Homomorphic Encryption, Pattern Recognition, vol. 67, pp. 149-163. https://www.sciencedirect.com/science/article/pii/S0031320317300249 (Year: 2017).*

(Continued)

*Primary Examiner* — Kendall Dolly
(74) *Attorney, Agent, or Firm* — Lavanya Ratnam; Robert W. Busby; Kelly G. Hyndman

(57) ABSTRACT

Systems and methods for secure distribution of biometric matching processing are provided. Certain configurations include homomorphic encrypting of captured biometric information. In some configurations, the biometric information is classified without decryption between a first identity class and a second identity class. The biometric information may be formed as a feature vector. A homomorphic encrypted feature vector may be formed by homomorphic encrypting of the biometric information.

15 Claims, 9 Drawing Sheets

(56) References Cited

U.S. PATENT DOCUMENTS

| | | | |
|---|---|---|---|
| 9,904,840 B2* | 2/2018 | Zhang | G06V 30/19173 |
| 11,277,258 B1* | 3/2022 | Zhang | H04L 9/3231 |
| 11,451,394 B2 | 9/2022 | Arora et al. | |
| 11,496,288 B1 | 11/2022 | Soltani et al. | |
| 2006/0112278 A1 | 5/2006 | Cohen et al. | |
| 2008/0097851 A1 | 4/2008 | Bemmel et al. | |
| 2013/0148868 A1* | 6/2013 | Troncoso Pastoriza | H04L 9/3093 382/118 |
| 2015/0046990 A1 | 2/2015 | Oberheide et al. | |
| 2015/0186634 A1 | 7/2015 | Crandell et al. | |
| 2016/0103984 A1* | 4/2016 | Warrier | G06F 21/6245 713/186 |
| 2016/0204936 A1 | 7/2016 | Sakemi et al. | |
| 2018/0053005 A1* | 2/2018 | Kamal | G06F 21/602 |
| 2019/0044697 A1 | 2/2019 | Paz de Araujo et al. | |
| 2019/0278895 A1* | 9/2019 | Streit | G06N 3/08 |
| 2019/0278937 A1* | 9/2019 | Streit | H04L 63/0407 |
| 2019/0280869 A1 | 9/2019 | Streit | |
| 2019/0370688 A1* | 12/2019 | Patel | H04L 9/3231 |
| 2020/0044852 A1 | 2/2020 | Streit | |
| 2020/0136818 A1 | 4/2020 | Jiang et al. | |
| 2020/0228339 A1* | 7/2020 | Barham | H04L 9/0869 |
| 2020/0228341 A1* | 7/2020 | Mohassel | H04L 9/0869 |
| 2020/0358611 A1 | 11/2020 | Hoang | |
| 2021/0124815 A1 | 4/2021 | Rindal | |
| 2021/0211290 A1* | 7/2021 | Jindal | H04L 9/3006 |
| 2021/0211291 A1 | 7/2021 | Jindal et al. | |
| 2021/0344477 A1* | 11/2021 | Aharoni | H04L 9/008 |
| 2021/0377031 A1* | 12/2021 | Aharoni | H04L 9/3231 |
| 2022/0085971 A1 | 3/2022 | Zhang et al. | |
| 2022/0103362 A1 | 3/2022 | Chafni et al. | |
| 2022/0109574 A1 | 4/2022 | Narumanchi et al. | |
| 2022/0131698 A1* | 4/2022 | Badrinarayanan | H04L 9/3271 |
| 2022/0277064 A1* | 9/2022 | Streit | G06V 40/1365 |
| 2022/0300593 A1 | 9/2022 | Brownlee | |
| 2022/0321348 A1 | 10/2022 | Isshiki | |
| 2022/0322083 A1* | 10/2022 | Kreishan | H04W 12/0431 |
| 2023/0011633 A1* | 1/2023 | Waldron | H04L 63/00 |
| 2023/0033479 A1 | 2/2023 | Despiegel et al. | |

OTHER PUBLICATIONS

R. L. Lagendijk, Z. Erkin and M. Barni, "Encrypted signal processing for privacy protection: Conveying the utility of homomorphic encryption and multiparty computation," in IEEE Signal Processing Magazine, vol. 30, No. 1, pp. 82-105, Jan. 2013, doi: 10.1109/MSP.2012.2219653. (Year: 2013).*

Otto, Nate et al., Verifiable Credentials Use Cases, W3C Working Group Note Sep. 24, 2019, https://www.w3.org/TR/2019/NOTE-vc-use-cases-20190924.

Buolamwini, Joy et al., Gender Shades: Intersectional Accuracy Disparities in Commercial Gender Classification, Proceedings of Machine Learning Research, 81, pp. 1-15, 2018.

Gentry, Craig et al., "Homomorphic Encryption from Learning with Errors: Conceptually-Simpler, Asymptotically-Faster, Attribute-Based", Jun. 8, 2013.

Rivest, Ronald et al., On Data Banks and Privacy Homomorphisms, Massachusetts Institute of Technology, Cambridge, Massachusetts, 1978.

Paillier, Pascal, "Public-Key Cryptosystems Based on Composite Degree Residuosity Classes", Springer-Verlag Berlin Heidelberg, Eurocrypt'99, LNCS 1592, pp. 223-238, 1999.

Sing, Harmeet, Public-Key Cryptosystem Based on Composite Degree Residuosity Classes aka Paillier Cryptosystem, Winter 2018.

Chillotti, Ilaria et al., "TFHE: Fast Fully Homomorphic Encryption over the Torus", Journal of Cryptology 33, published Apr. 25, 2019.

Boddeti, Vishnu Naresh, "Secure Face Matching Using Fully Homomorphic Encryption" Michigan State University, East Lansing, MI, Jul. 2018.

Liu, Qingshan, et al. "Occlusion Robust Face Recognition with Dynamic Similarity Features", 18th International Conference on Pattern Recognition (ICPR' 2006) 0-7695-2521-0/06, IEEE.

Nguyen, Hieu V. and Li Bai, "Cosine Similarity Metric Learning for Face Verification", DOI: 10.1007/978-3-642-19309-5_55, source: DBLP Nov. 2010, https://www.researchgate.net/publication/220745463.

Remani, Naga et al., "Similarity of Inference Face Matching on Angle Oriented Face Recognition", Journal of Information Engineering and Applications, ISSN 2224-5758 (print), ISSN 2224-896X (online). vol. 1, No. 1, 2011.

Ahdid, Rachid et al., "Euclidean & Geodesic Distance between a Facial Feature Points in Two-Dimensional Face Recognition System", International Journal of Neural Networks and Advanced Applications, vol. 4, 2017.

Boneh, Dan et al., "Evaluating 2-DNF Formulas on Ciphertexts" Apr. 2, 2006.

Vytautas Perlibakas, "Distance measures for PCA-based face recognition", Pattern Recognition Letters vol. 25 (2004), pp. 711-724.

Eugenio A. Silva, "Practical use of Partially Homomorphic Cryptography", 2016.

P. Jonathon Phillips, "Support Vector Machines Applied to Face Recognition", Advances in Neural Information Processing Systems 11, technical report NISTIR 6241, 1999.

Sadeghi, Ahmad-Reza, et al., "Efficient Privacy-Preserving Face Recognition", ICISC, 2009.

TSA Biometrics Roadmap for Aviation Security & the Passenger Experience, Sep. 2018.

Chibba, Michelle, et al., "On Uniqueness of Facial Recognition Templates", NTIA US Department of Commerce, Privacy Multistakeholder Process: Facial Recognition Technology, Mar. 2014.

* cited by examiner

THIRD PARTY BIOMETRIC HOMOMORPHIC ENCRYPTION MATCHING FOR PRIVACY PROTECTION

CROSS-REFERENCE

This application claims the benefit of priority to U.S. Provisional Application No. 63/350,684 filed Jun. 9, 2022, incorporated by reference in its entirety.

This application incorporates by reference Ser. No. 18/080,554, filed on the same date as this application, entitled, "Biometric Identification Using Homomorphic Primary Matching With Failover Non-Encrypted Exception Handling," in its entirety.

STATEMENT OF GOVERNMENT INTEREST

The present invention was made by employees of the United States Department of Homeland Security in the performance of their official duties.

FIELD

The present disclosure relates generally to privacy protection in distributed processing of biometric information.

BACKGROUND

Computer-implemented methods of determining and verifying an individual's identity, e.g., in screening individuals prior to boarding aircraft, can include comparison of recently captured biometric image, e.g., screening station capture of a traveler's face or fingerprints, against one or more reference biometric images. The comparison against more than one reference biometric image can be 1:N or "one-to-many", in which the recently captured biometric image is compared against a gallery of N reference biometric images, corresponding to N different individuals. Current techniques can have shortcoming including difficulty in distributing or outsourcing computationally burdensome operations due, for example, to privacy concerns regarding captured biometric information.

C. Gentry, A. Sahai, and B. Waters. *Homomorphic Encryption from Learning with Errors: Conceptually-Simpler, Asymptotically-Faster, Attribute-Based*. In Advances in Cryptology CRYPTO 2013, pages 75-92. Springer, 2013 incorporated by reference in its entirety discusses techniques for implementing fully homomorphic encryption.

P. Paillier, *Public-key Cryptosystems Based on Composite Degree Residuosity Classes*, in Advances in cryptology-EUROCRYPT'99. Springer, 1999, pp. 223-238; and R. L. Rivest, L. Adleman, and M. L. Dertouzos, *On Data Banks and Privacy Homomorphisms, Foundations of Secure Computation*, vol. 4, no. 11, pp. 169-180, 1978 incorporated by reference in their entirety, discuss techniques for partially homomorphic encryption.

SUMMARY

In one configuration, a system for secure HE encryption and access control is provided. The system may comprise: a reference gallery of HE encrypted biometric information; a third-party computer; HE biometric matching logic; and an access control device. The kiosk may comprise a scanner connected to the reference gallery via a cloud resource; the scanner configured to: generate biometric information to store in the reference gallery; scan a user and generate biometric information identifying the user from the scan; and generate HE encrypted information containing biometric data using an HE encryption algorithm. The system may be configured to: store HE encrypted biometric information in a library; and distribute the HE encrypted biometric information to the third-party computer. The system may comprise HE encryption logic configured to construct, based on the reference gallery, HE encrypted reference information. The system may comprise the HE Encryption logic configured to store HE encrypted information in the reference gallery. The third-party computer may comprise HE biometric matching logic configured to perform a HE biometric matching process. The HE biometric matching logic may be configured to perform a matching comparison of the HE encrypted information from the library against HE encrypted biometric information in the reference gallery to identify matching HE encrypted reference information. The HE biometric matching logic may be configured to perform the HE biometric matching process without decrypting or having a capacity to decrypt the HE encrypted information. The third-party computer may be configured to process biometric information used for biometric matching, without access to underlying biometric information of the user. The third-party computer may be configured to transmit a message to the access control device. The access control device may be programmed to execute an access granted process if the message indicates a positive match based on the matching comparison. The access control device may be programmed to execute an access denied process if the message does not indicate a positive match based on the matching comparison.

BRIEF DESCRIPTION OF THE DRAWINGS

The drawing figures illustrate one or more implementations in with the teachings of this disclosure, by way of example, not by way of limitation. In the figures, like reference numbers refer to the same or similar elements. It will be understood that the drawings are not necessarily to scale.

DETAILED DESCRIPTION

Figure 1:
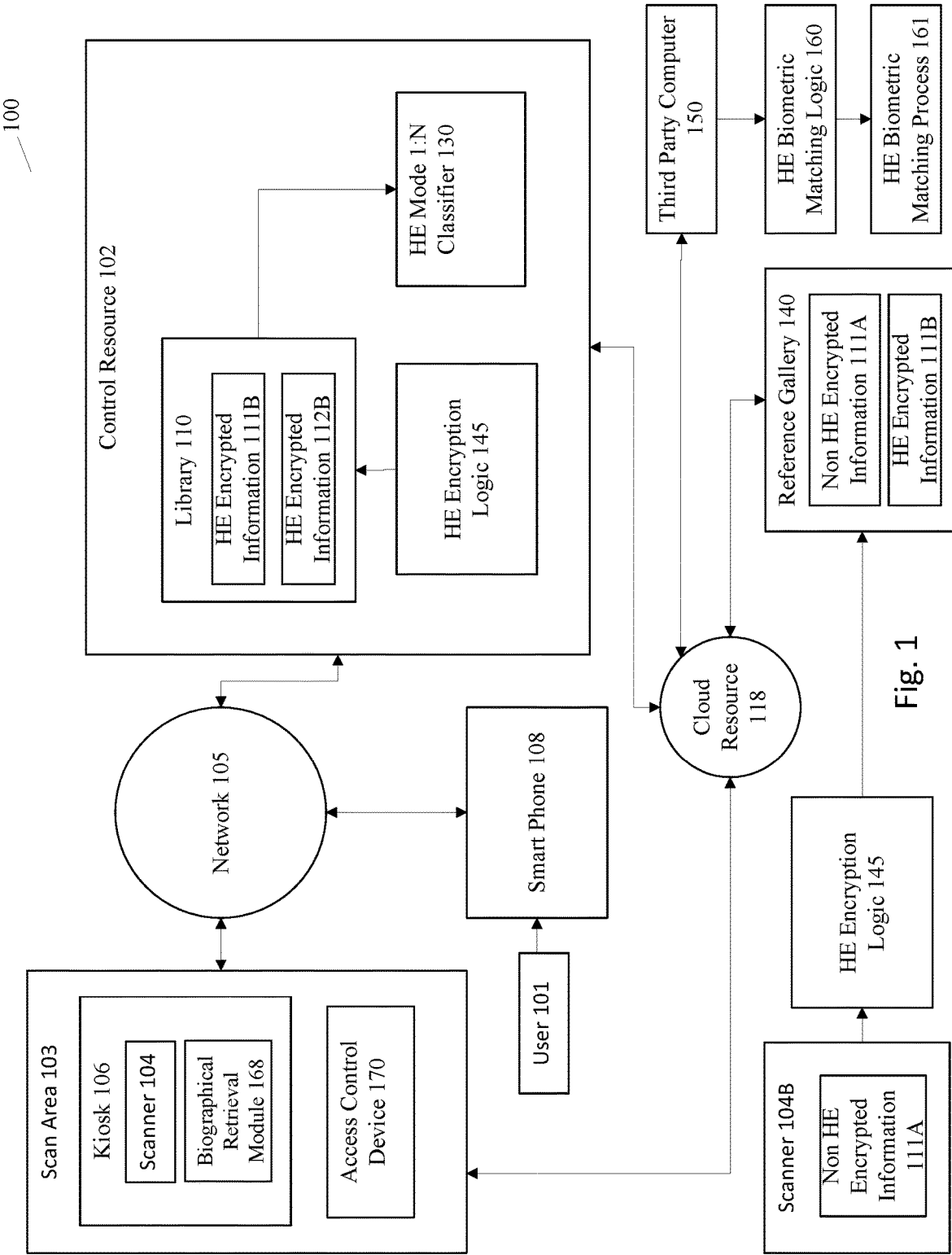
FIG. 1 shows a system for capturing and HE encrypting of user information for providing controlled access to a restricted area.

FIG. 1 shows a system comprising a library 110 of reference biometric information, such as first biometric information 111B and second biometric information 112B. The first HE encrypted biometric information 111B and second biometric information 112B may be images and they may be HE encrypted. The system may be configured receive new HE encrypted facial images or HE encrypted information from such images. The system may comprise a HE mode 1:N classifier configured to perform, via exploitations of certain HE encryption features, 1:N classification of the new HE encrypted facial images or HE encrypted information against the N verified identity individuals. The biometric images may be facial images which may be reference biometric images for each of N verified identity individuals. The library may be encrypted by homomorphic encryption (HE) to form a corresponding HE reference library. The system may comprise a homomorphic encrypted reference biometric image for each of N verified individuals. Exploitation of certain HE encryption may include features like secure 1:N classification, without decrypting; no capability of decrypting the new HE encrypted facial image; no access to the N individuals' library images; and no access to the N individuals' identities.

The system 100 may be configured to provide secure communication of biometric information even if the security of communication channels or servers is compromised. The system may be configured to provide multi-sourced, load adaptive balancing. FIGS. 1-7 show various configurations of the system.

The system 100 can include features such a control resource 102, a kiosk 106, a third-party computer 150, and a reference gallery 140. These features may be connected via a network.

The control resource 102 may be a computer or server comprising a processor, system memory, a bus, tangible storage memory for non-transitory storage of computer readable instruction for the processor to execute.

A kiosk 106 may comprise a scanner that can be configured to interface with the local network 105. The kiosk 106 can include communication resources for wireless communication with a user's smart phone, such as the example smart phone 108. The kiosk may be a computer or server comprising a processor, system memory, a bus, tangible storage memory for non-transitory storage of computer readable instruction for the processor to execute.

A scanner 104 may be located in the screening area SCA. A scanner 104 may be a scanning device configured to scan a user such as a traveler or an object such as baggage. The scanner may be located within a screening area 103 (SCA). Scanners in the screening areas may include a first millimeter wave scanner (MMW), a second MMW scanner each communicatively connected via the local network 105 to the control resource 102. Equipment in the screening area SCA can also include an access control device. The scanner may be a computer tomography scanner 104 (CT or CT scanner) for checked carry-on luggage. The scanner may also be a metal detector, trace chemical detector, magnetometer, identity verification devices, additional e-gates, mantrap, or X-ray machine.

The system 100 may comprise a reference gallery 140 of HE encrypted biometric information 111B (e.g., facial images, fingerprints, etc.) The biometric images may be HE encrypted biometric images. The reference gallery 140 may be accessible to the kiosk 106, e-gate 112, etc. via a cloud resource 118. The biometric reference gallery 140 may be configured to store a gallery of biometric reference images captured from N different individuals. The biometric reference gallery 140 may be configured to store one or more biometric reference images of one or more biometric types (a facial image, a fingerprint image, etc.) for each of N identities. The biometric reference gallery 140 may be configured to store, for each of one or more of the N identities, a plurality of reference images including different capture angles, different lightings, different facial expressions, etc. Biometric reference images stored in the biometric reference gallery 140 may include gait or other movement biometrics.

Biometric reference image may encompass visible images of an individual's face or fingerprints, e.g. a row-by-column pixel array, e.g., grey scale or red-green-blue (RGB). Biometric reference images may include information which can characterize features of the image (either additional to or in place of a visible image pixel array). Such characterizing can be obtained by analysis on or extraction from captured images. The characterizing features can be stored as image feature vectors. That is, the biometric reference image may include a visible image pixel array. The system may be configured to obtain information characterizing features of the biometric reference image by extracting information from a captured image. The reference gallery may be configured to store the characterizing features as image feature vectors. Examples of image feature vectors include a Principal Component Analysis (PCA). PCA is an orthogonal linear transformation that can transform data into a new coordinate system such that the greatest variance by some scalar projection of the data comes to lie on the first principal component, the second greatest variance on the second principal component, and so forth. Other benefits of storing the reference images as feature vectors can include reduced dimensionality, e.g., for conserving memory space. Another benefit, or requirement, can include compatibility with HE mode classifier configurations implemented by the third-party computer 150.

In some configurations, a scanner 104B or kiosk may generate images to store in the reference gallery. The reference gallery 140 can include a first biometric reference gallery. A HE encryption logic 145 may be provided for constructing, based on the biometric reference gallery, HE encrypted biometric information 111B (or HE encrypted biometric images). The reference gallery may comprise a non-HE encrypted image 111A. The HE encryption logic 145 may store HE encrypted images in the reference gallery.

The kiosk 106 and/or scanners 104 may be configured to generate biometric information from a user. The kiosk and/or scanner may use an HE encryption algorithm to generate HE encrypted images containing biometric information. The kiosk and/or scanner may store the HE encrypted images in the library 110. The kiosk and/or scanner may be configured to distribute (e.g., upload via a cloud service) the HE encrypted biometric information to a third-party computer 150. The third-party computer 150 can be configured to perform a HE biometric matching process 155 using HE biometric matching logic. The third-party computer may comprise a third party HE mode computer. The HE biometric matching logic 160 may be configured to match of the HE encrypted images from the image library 110 against HE encrypted images in the biometric reference gallery 140. The HE biometric matching logic 160 may include matching of HE encrypted information from the image library 110 against HE encrypted information in the biometric reference gallery 140. The HE biometric matching logic 160 may perform the HE biometric matching process 161 to generate a matching comparison 162 (FIG. 2) without decrypting or having the capacity to decrypt the HE encrypted images or HE encrypted information. The HE biometric matching logic may be configured to determine how closely an image from the reference gallery 140 matches an image from the library 110 for a particular user (without knowing the identity of the user.) The matching comparison may comprise a match percentage, and HE biometric matching logic may determine whether the match percentage is above a predetermined threshold. The predetermined threshold may be modified depending on security needs of the system. The third-party computer may include open command 180 or close command 185 in a message 165 to cause the access control device to 170 to follow access granted process 172 or access denied process 173. In other configurations, the access logic can be configured to determine whether the match percentage exceeds the predetermined threshold. The third-party computer may be configured to process biometric information used for biometric matching, without access to the underlying biometric information of the user.

The HE biometric matching logic may be configured to perform a matching comparison 162 (FIG. 2) of the HE encrypted information from the library against HE encrypted biometric information in the reference gallery to identify matching HE encrypted reference information. The HE biometric matching logic may be configured to perform the HE biometric matching process without decrypting or having a capacity to decrypt the HE encrypted information;

An access control device 170 can be an electromechanical device configured to restrict or block movement of a person through or into a restricted area. In FIG. 1, the access control device is depicted to be within the scanning area, but it might be located in other areas. In some configurations, it might be integrated as part of the kiosk 106 or it might be it's own physical device electronically connected to the network and/or the kiosk. The access control device 170 can be an electronic gate or an electronic door. It could be an electronic lock for a hatch. It can be a turn-style. The access control device can be configured to provide an operator with a message to permit or deny access to a user. The access control device 170 can include biometric matching technology, e.g., a fingerprint scanner, or a facial image capture device, etc.

Figure 2:
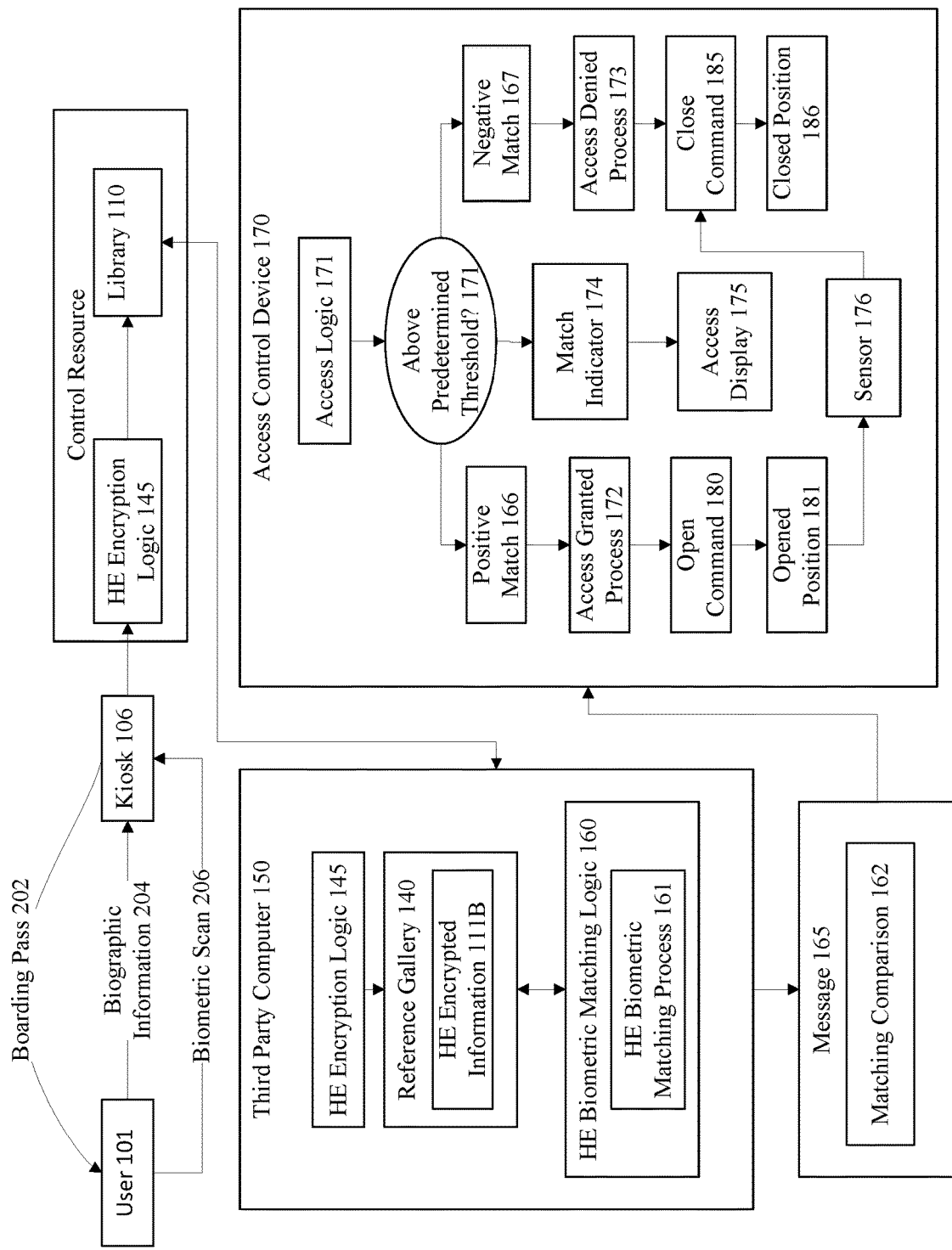
FIG. 2 shows additional detail of an access control device.

As shown in FIG. 2, the third-party computer 150 may be configured to transmit a message 165 to the access control device. In other configurations, the third-party computer 150 might transmit a message to the kiosk 106 and the kiosk might communicate with the access control device. In other configurations, the kiosk 106 and the access control device 170 might be an integrated unit. The access control device 170 may comprise access logic configured to determine whether the matching comparison is above a predetermined threshold. The access control device may be programmed to execute an access granted process 172 if matching comparison is above the predetermined threshold. The access control device may be programmed to execute an access denied process 173 if matching comparison is below the predetermined threshold. In other configurations, the message 165 may indicate a positive match based on the matching comparison 162. The access control device 170 may be programmed to execute the access granted process 172 if the message indicates a positive match 166 based on the matching comparison 162. The access control device 170 may be programmed to execute an access denied process 173 if the message indicates negative match 167 based on the matching comparison 162. The access control device may comprise an access display 175 configured to display a match indicator 174 based on a result from the matching comparison 162. The match indicator 174 may be configured to indicate a positive match 166 if the matching comparison exceeds a predetermined threshold 171. The match indicator 174 configured to indicate a negative match 167 if the matching comparison 162 does not exceed a predetermined threshold. The access display 175 may be configured to display the match indicator 174 to the user or an operator. The access control device 170 may generate an open command 180 configured to cause the access control device to shift from a closed position 186 into an opened position 181. In the closed position 186, the access control device 170 may restrict or block access of a user to a restricted area. In the closed position 186, the access control device may restrict or block a user from exiting a certain area. In the closed position, the access control device may restrict or block a user from access a secure container. In the closed position, the access control device may lock or seal a door, gate, or hatch. In other configurations, the message 165 itself may comprise an open command configured to cause the access control device to shift from the closed position into the opened position. The access control device may comprise a sensor 176 configured to determine whether the user has passed through or within a predetermined radius of the access control device. The access control device may be configured to shift from the opened position 181 into the closed position 186 after receiving a message 165 from the sensor 176 that the user has passed or within a predetermined radius of the access control device.

As shown in FIG. 2, a user 101 can arrive at the kiosk 106 to obtain a boarding pass, and operations can include the kiosk 106 receiving, for example from an app on the user's smart phone 108, various biographic information, e.g., his full name, date of birth, mailing address. In overview, assuming that a traveler (e.g., Passenger, User or "USR"), purchases a ticket for a flight. The USR will arrive at the airport and walk up to the kiosk 106 to obtain a boarding pass. It will be assumed that prior to USR's arrival, the system 100 has uploaded to one or more of the third-party computers 120 an HE encrypted reference gallery. The HE encrypted reference gallery can be obtained, for example, from one or more of the biometric reference galleries 122. Operations at the kiosk 106 can include USR inputting, via an app on her or his smart phone 108, various biographic information, e.g., her or his full name, date of birth, mailing address, and so forth. Subsequently, kiosk 106 performs a capturing of biometric information from USR, e.g., a facial image or fingerprints or both, followed by computing a HE encryption of the biometric information, or HE encryption of particular features the kiosk 106 obtains or extracts from the biometric information, i.e., from the facial images and fingerprints.

Figure 3:
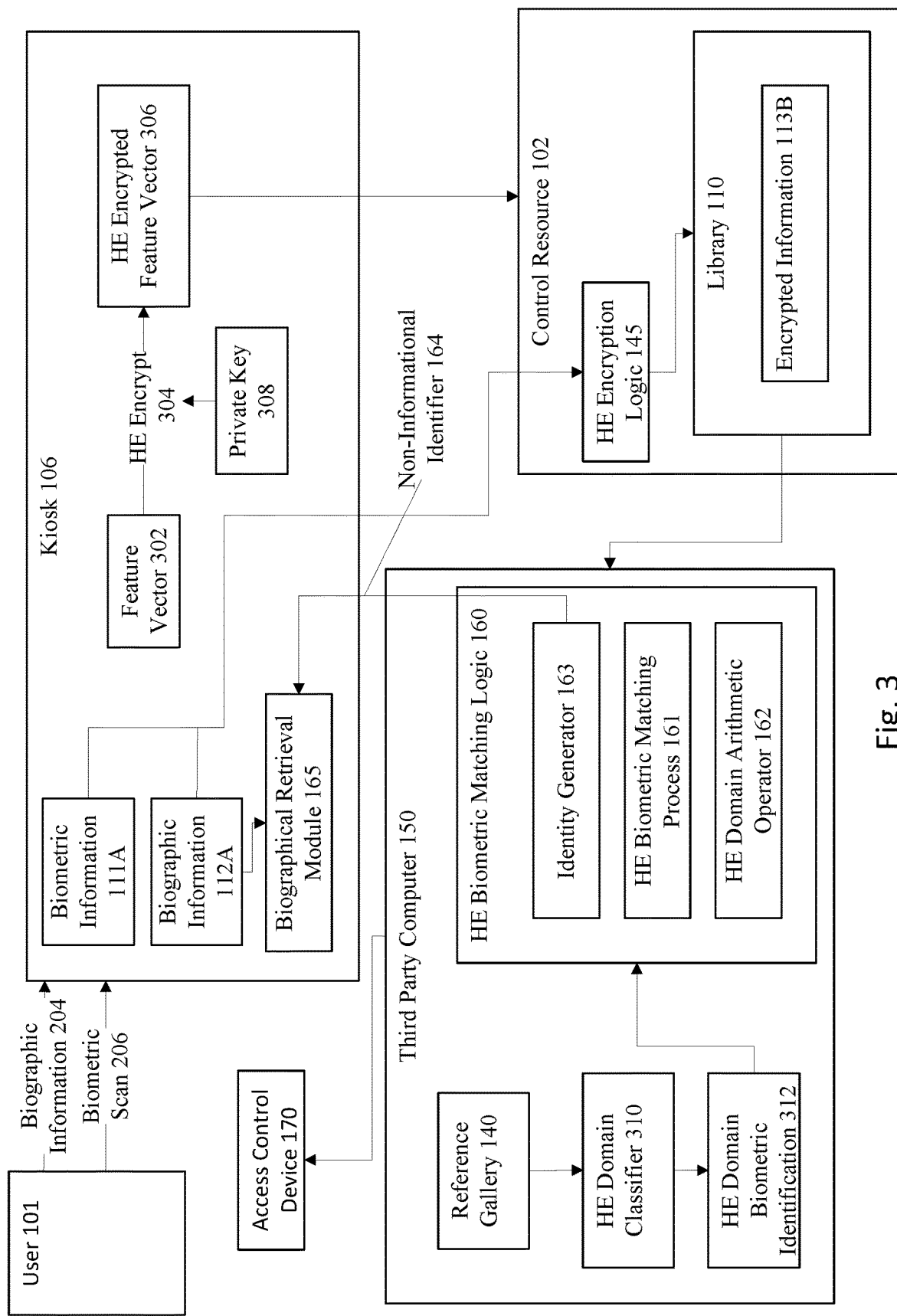
FIG. 3 shows additional details of a third-party computer and kiosk.

As shown in FIG. 3, the kiosk 106 can HE encrypt 304 a feature vector 302 to form a HE encrypted feature vector 306. The HE encrypted feature vector can be a one-dimensional vector of V HE encrypted element. The HE encryption performed by the kiosk 106 can utilize a private key 308, and the HE encryption scheme can be configured such that an attempting entity cannot, without possessing permissions, e.g., the private key, cannot obtain the underlying biometric information Obtaining or extracting of features, as described in further detail in subsequent paragraphs, can include but is not limited to applying one or more orthogonal basis function transforms, e.g., the Discrete Cosine Transform (DCT), or applying feature filters, e.g., convolving of one or more two-dimensional spatial filters. In various embodiments, such transforms or application of feature filters can generate a one-dimensional vector, as opposed to the original row-by-column pixel array. For purposes of description, such one-dimensional vectors will be generally referred to as "feature vectors." The feature vector can be a V-element feature vector, "V" being an integer. Example values of V can include, but are not limited to, V=8, V=16, V=32, . . . , V=256, and all values therebetween, as well as values lower than 8 and values greater than 256 and can include values in which integer 2 is not a multiplicative factor.

The kiosk 106 can distribute, for example, through the control resource 102, or through local network, or both, via the cloud resource 118, the USR's HE encrypted biometric information, e.g., the HE encrypted feature vector, to external processing resources, such as the one or more of the third-party computers 120. As described above, the third-party computers 120 can possess one or more HE encrypted reference galleries provided, for example, by one or more of the biometric reference galleries 122.

The third-party computer 150 may comprise a HE domain classifier 310 configured perform HE domain biometric identification 312 of the USR 101. The third-party resource may be configured to compare, using the HE Biometric Matching Logic 160 and HE biometric matching process 161, the USR's HE encrypted information 113B (such an encrypted biometric information, encrypted biometric images, and/or encrypted biographic information) against the third-party computer's 150 copy of the HE encrypted reference gallery 140. The HE Biometric Matching Logic 160 may comprise a HE domain arithmetic operator to perform HE domain arithmetic operations to perform the matching comparison. The HE domain arithmetic operations can include, for example, a HE domain vector similarity or distance algorithm, to find the closest match, if any, meeting a similarity threshold.

The third-party computer 150 may comprise an identity generator 163. The identity generator may be configured to generate a non-informational identifier 164 for the matching HE encrypted reference image if the HE biometric matching logic 160 identifies a similarity match within a similarity threshold. The identity generator and/or third-party computer 150 may be configured to transmit the non-informational identifier to the kiosk 106. The kiosk 106 may comprise a biographical retrieval module 168 configured to retrieve biographical information 112A of the user 101 corresponding to the non-informational identifier 164. The kiosk may be configured to receive N individual library images of N individuals. The N individuals may have an identity associated biographic information. The kiosk may comprise a database configured to store N identities of N users.

The kiosk, control resource, and third-party computer may have their own HE encryption logic. The HE encryption logic may apply partially homomorphic encryption (PHE), fully homomorphic encryption (FHE), and somewhat homomorphic encryption (SHE). Implementations of FHE can enable an unlimited number of type of operations with unlimited number of repetitions. Implementation of PHE may, in contrast, allow unlimited repetitions of only one type of operation, e.g., multiplication.

Figure 4:
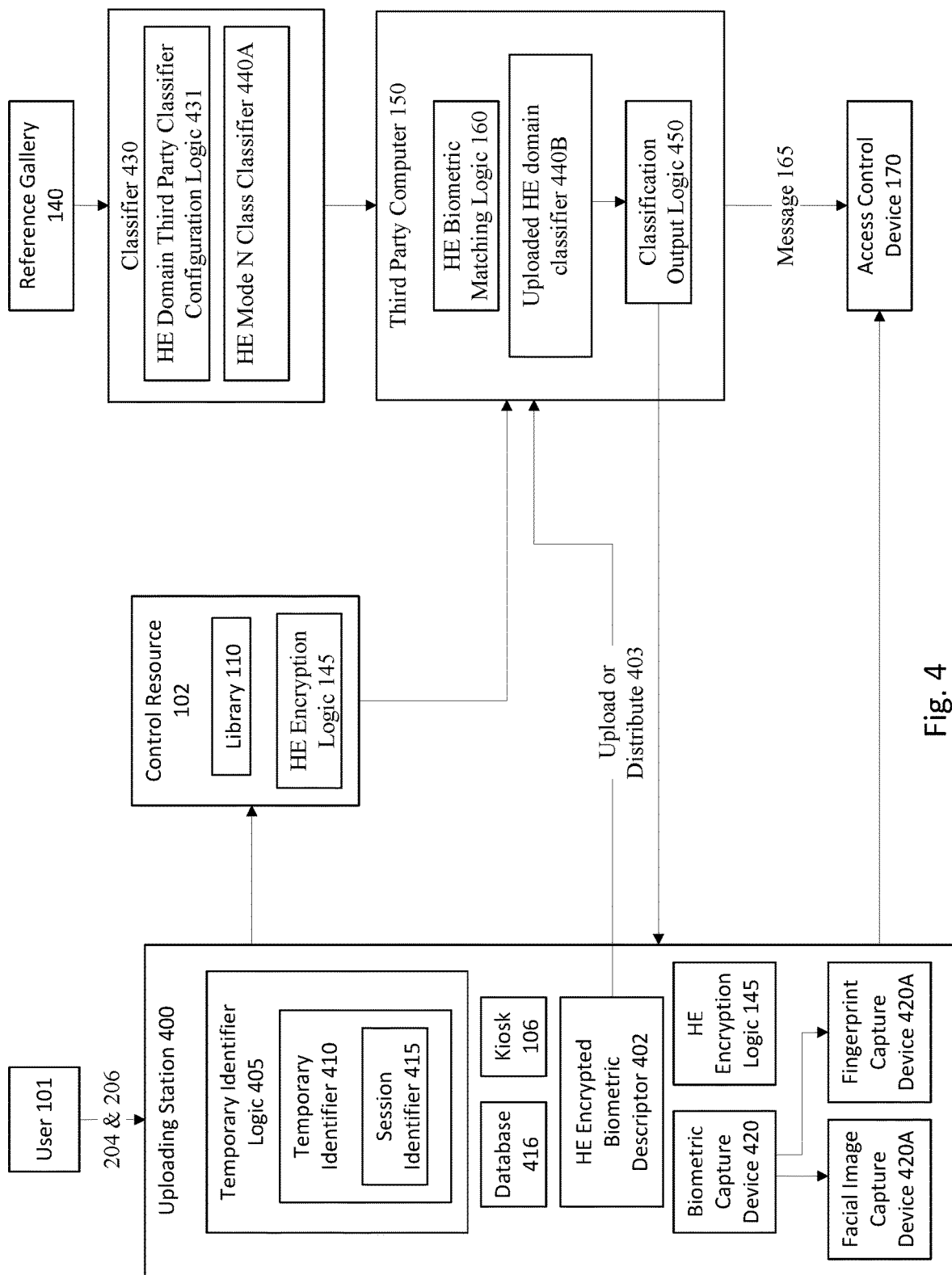
FIG. 4 shows a system comprising an uploading station, control resource, classifier, access control device, third-party computer and reference gallery.

FIG. 4 shows a system, optionally configured for distributed HE locked, keyless HE domain, non-decrypting biometric classification. The system may comprise an uploading station 400 configured to capture biometric information of a user 101. The uploading station may be HE locked. The system may comprise multiple uploading stations.

The uploading station 400 may comprise temporary identifier logic 405 configured to receive from the user's smartphone 108 biographical information 204 such as last name, first name, date of birth, mailing address of the user 101. The uploading station may comprise a kiosk. The temporary identifier logic 405 may generate a temporary identifier 410. The temporary identifier logic 405 may be configured to store a correspondence between the biographical information and the temporary identifier 410. The temporary identifier 410 may contain a session identifier 415 used to identify a communication between the smart phone 108 and the uploading station.

Referring to FIG. 4, the uploading station 400 may comprise a biometric capture device 420. The biometric capture device may comprise or be connected to a facial image capture device 420A and/or a fingerprint capture device 420B. The biometric capture device 420 can be connected to HE encryption logic 145. The HE encryption logic 145 may be configured to apply a partially homomorphic encryption or a fully homomorphic encryption. The reference gallery 140 may be configured to store biometric reference images in N classes.

As described below, the system may comprise a classifier designed to select a type of HE encryption for programming the third-party computer. The uploading station 400 may be configured to upload encrypted biometric information to third-party computer 150. The third-party computer 150 may be configured to receive a HE encrypted biometric descriptor 402 from the uploading station 400. The third-party computer may be connected to or comprise a classifier 430 configured to classify the received HE encrypted biometric descriptor among N identity classes, without decryption of the HE encrypted biometric descriptor, and without access to the underlying N identities. The third-party computer 150 may be configured to receive a distribution of HE encrypted information. The third-party computer 150 may comprise a classifier configured to classify the distribution among the N classes without the third-party computer 150 obtaining access to the underlying N identities and without the third-party computer having access to the underlying N identities.

The classifier 430 may be configured to perform HE domain classification on the received biometric information from the uploading station. The classifier may comprise HE domain third party classifier configuration logic 431. The classifier 430 may be configured to construct an HE mode N class classifier 440A. The classifier 430 may be configured to communicate the HE mode N class classifier 440A to the third-party computer 150 via a network or cloud service. Communication of the HE mode N class classifier may include an initial communication of an initial N class classifier, followed by one or more updates. The HE mode N class classifier 440A updates may be periodic, aperiodic, event-driven, or both. An update to the reference gallery 140 may trigger the HE mode N class classifier to perform the update. Operations in communicating the constructed/loaded HE mode domain class classifier 440B from the classifier 430 to the third-party computer 150 may include communicating executable instruction files. The classifier 430 may include in its communication of the HE mode N class classifier to the third-party computer a communication to a controlling authority to install the HE Mode N Class Classifier 440A in the memory of the third-party computer 150.

The third-party computer 150 may be configured to receive the HE mode N class classifier 440A constructed by the HE domain third party classifier configuration logic 218. With the HE mode N class classifier 440A, the third-party computer 150 can load or install the HE mode N class classifier as a loaded HE domain classifier 440B. The third-party computer 150 may include classification output logic 450. The classification output logic 450 may be configured to communicate results from the loaded HE domain classifier 440B to a destination 460. The destination 460 may be the uploading station 400 that uploaded 403 the HE encrypted biometric descriptor. For example, a destination can be the kiosk implementation of the uploading station 400, the destination configured to upload the HE encrypted biometric descriptor 402 based on a biometric capture of the user. Results from the loaded HE domain class classifier 440B of the HE encrypted biometric descriptor 402 can be communicated back to the kiosk 106, e.g., for display. The uploading station 400 or kiosk 106 may be configured to display results from the loaded HE domain class classifier 440B of the HE encrypted biometric descriptor 402.

Factors relevant to configuring the classifier 430 can include a specific type of HE encryption technology. For example, the system/HE encryption logic may be configured to use fully homomorphic encryption (FHE). FME can exploit at least two significant FME features. The first feature generally allows an unlimited number of repetitions of arithmetic operations on HME encrypted operands. The second feature generally allows for a library of permissible arithmetic operations that can include both addition and multiplication. The system/HE encryption logic may be configured to use partially homomorphic encryption (PHE). Different factors may be considered in the configuring of the HE domain third party classifier configuration logic 431. For example, generally, PHE allows a single mathematical function, e.g., multiplication or addition, but not both, on a single PHE encrypted data. Therefore, in implementations using PHE, a factor for consideration in configuring the HE domain third party classifier configuration logic 431 is that impracticalities may be encountered in generating a HE domain classifier that uses both addition and multiplication.

The HE domain third party classifier configuration logic 431 may be configured to construct a HE domain artificial neural network for uploading to one or more of the third-party computer 150. The HE domain artificial neural network can include HE domain N-class convolutional neural network (CNN) biometric classification model, for uploading to one or more of the third-party computers 150. The HE domain third party classifier configuration logic 431 may be configured to first construct a clear-text version of the HE mode, N-class CNN biometric classification model, followed by training the clear-text version using, for example, the N reference images, RG(n), n=1 to N, stored in the reference gallery 140. The HE domain third party classifier configuration logic 431 can be further configured to convert the clear-text version of the HE mode, N-class CNN biometric classification model, after the training, to the HE mode. In an embodiment, the HE domain third party classifier configuration logic 431 can be configured to then upload the entire HE mode, N-class CNN biometric classification model to the one or more of the third-party computers 150.

The HE domain third party classifier configuration logic 431 (and/or classifier 430) can be configured to construct a HE domain artificial neural network for uploading to one or more of the third-party computers 150. The HE domain artificial neural network may include an HE domain N-class convolutional neural network (CNN) biometric classification model, for uploading to one or more of the third-party computers 150. The HE domain third party classifier configuration logic 431 (and/or classifier 430) can be configured to first construct a clear-text version of the HE mode, N-class CNN biometric classification model, followed by training the clear-text version using, for example, the N reference images, RG(n), n=1 to N, stored in the reference gallery 140. The HE domain third party classifier configuration logic 431 (and/or classifier 430) can be further configured to convert the clear-text version of the HE mode, N-class CNN biometric classification model, after the training, to the HE mode N Class Classifier 440A. In an embodiment, the HE domain third party classifier configuration logic 431 (and/or classifier 430) can be configured to then upload the entire HE mode, N-class CNN biometric classification model to the one or more of the third-party computers 150.

Figure 5:
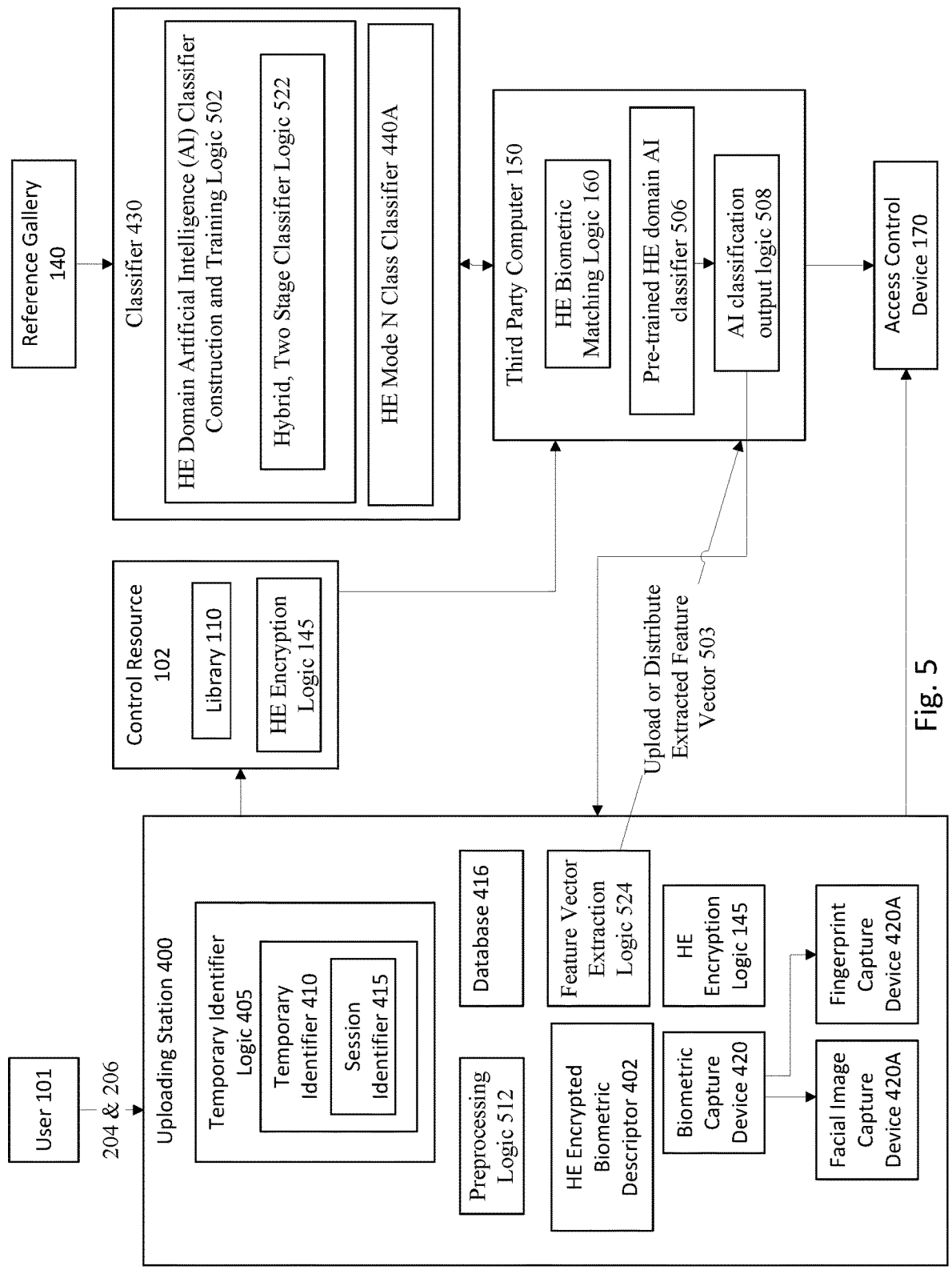
FIG. 5 shows a configuration comprising an uploading station, reference gallery, HE domain artificial intelligence classifier construction and training logic, third-party computer, and access control device.

FIG. 5 shows a functional block schematic of the system, including biographic capture and HE locked, keyless distribution to external processing resources, configured for HE domain, non-decrypting biometric classification in accordance with the present disclosure. The configuration of FIG. 5 may have the same functionality of the configuration shown in FIGS. 1-4 with the following modifications. The system of FIG. 5 substitutes a HE domain artificial intelligence (AI) classifier construction and training logic 502 for the HE domain third party classifier configuration logic 431 (FIG. 4). This configuration also substitutes the uploaded HE domain classifier 440B and classification output logic 450 (from FIG. 4) for a pre-trained HE domain AI classifier 506 and corresponding AI classification output logic 508 (in the third-party computer 150). To conform the HE encrypted captured biometric information uploaded from the uploading station (which may have biometric capture and HE Encryption) to the pre-trained HE domain AI classifier 506, the uploading station 400 (in FIG. 5) may comprise a pre-processing logic 512 configured to generate pre-processed biometric information. The uploading station 400 may also comprise adapted HE encryption logic 145. In FIG. 5, the HE encryption logic 145 exists in both the control resource 102 and the uploading station 400, but in some configurations, it may exist in one device but not the other. In some configurations, the uploading station 400, control resource 102, and access control device 170 may be an integrated unit.

The HE domain AI classifier construction and training logic 502 of FIG. 5 may be configured to construct the HE mode, N-class biometric classification model as a hybrid, two-stage classifier logic. The two stages can include a feature vector extraction first stage, and a feed-forward, artificial neural network (ANN) second stage. In an embodiment, configuration of the HE domain AI classifier construction and training logic 502 may comprise the hybrid, two-stage classifier logic 522. The hybrid, two stage classifier logic 522 may be configured to train the ANN second stage, followed by uploading the trained ANN second stage to the one or more of the third-party computers 150, and uploading to the uploading station 400 the feature vector extraction first stage. Corresponding logic of the uploading station 400 may comprise feature vector extraction logic 524 for extracting the feature vector from captured biometric images, such that the uploading of captured images to the third-party computer 150 comprises uploading of the extracted feature vector 503, as opposed to uploading the entire captured image.

Figure 6:
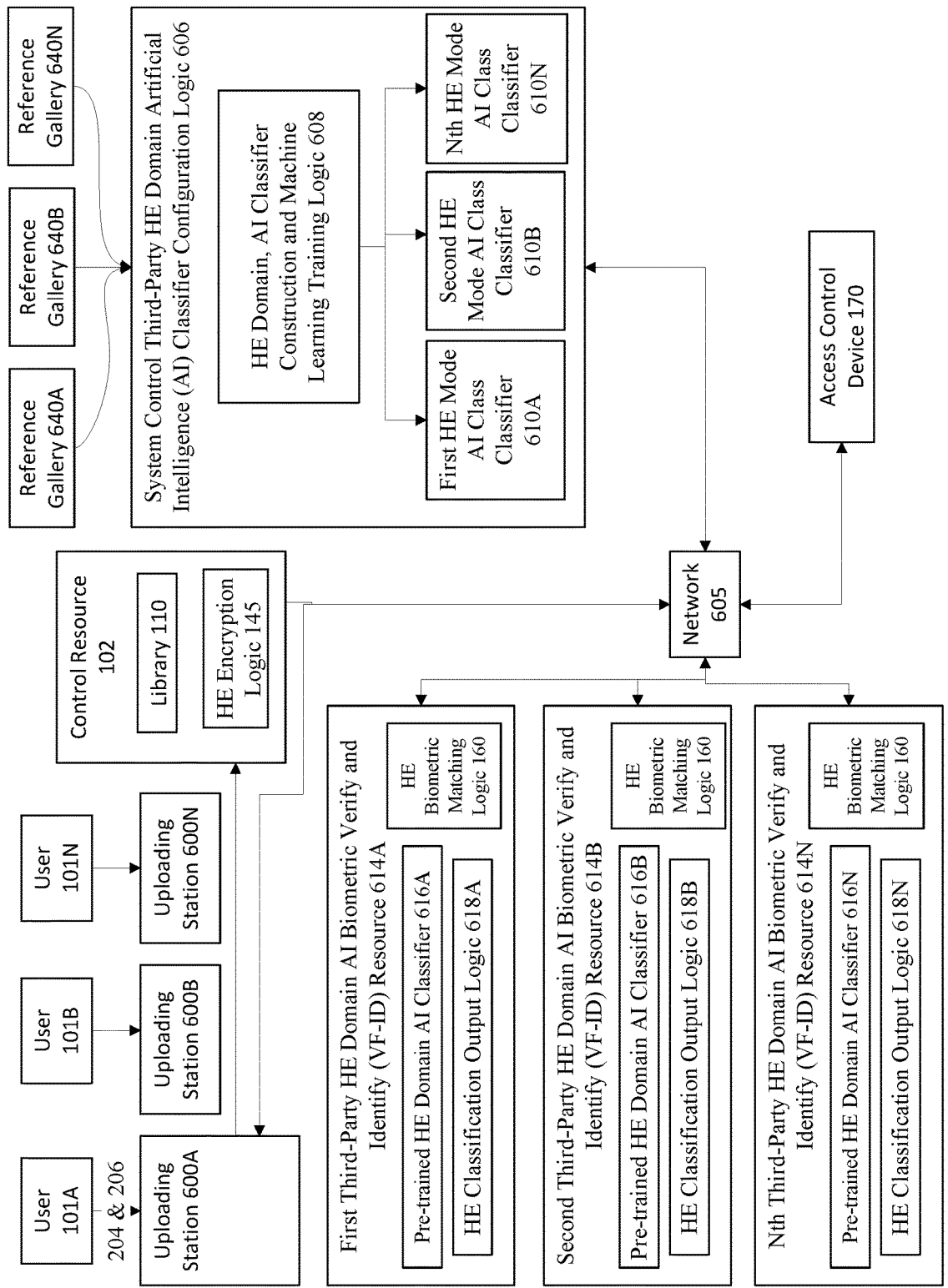
FIG. 6 shows a configuration comprising N uploading stations, control resource, N reference galleries, system control third-party HE domain artificial intelligence classifier configuration logic, access control device, and N third-party HE domain AI biometric verify and identity resources.

FIG. 6 shows a system comprising an uploading station 400, access control device 170, and a control resource 102. The configuration of FIG. 6 may have the same functionality of the configurations shown in FIGS. 1-5 with the following modifications. FIG. 6 shows a system having multiple reference galleries 640A, 640B, and 640N. Although it is contemplated that the configurations shown in the other figures also can multiple components such as multiple third-party computers, multiple reference galleries, multiple kiosks, multiple uploading stations, multiple access control systems, multiple classifiers, etc. In FIG. 6, there are N reference galleries shown wherein N is greater than or equal to 3.

The N reference galleries may be connected to a system control third-party HE domain artificial intelligence (AI) classifier configuration logic 606. The system control third-party HE domain artificial intelligence (AI) classifier configuration logic may comprise an HE domain, AI classifier construction and machine learning training logic 608. The HE domain, AI classifier construction and ML training logic 608 can be configured to construct and train a HE domain AI classifier for each of the reference galleries 640A-640N. The AI classifier construction and ML training logic 608 can be configured to construct and ML train a first HE mode AI class classifier 610A, which can correspond to the first reference gallery 640A. The AI classifier construction and ML training logic 608 can be configured to construct and ML train a second HE mode AI class classifier 610B, which can correspond to the second reference gallery 640B. The AI classifier construction and ML training logic 608 can be configured to construct and ML train an Nth HE mode AI class classifier 610N, which can correspond to the Nth reference gallery 640N. For brevity the first HE mode AI class classifier 610A, second HE mode AI class classifier 610B, . . . , Nth HE mode AI class classifier 610N are collectively referenced hereinafter as "HE mode AI class classifiers 610."

The first reference gallery 640A may be configured to store integer I1 first reference images (abbreviated "RG1"), as RG1(i1), with "i1" being an index, for i1=1, I1. The second reference gallery 640B can store integer I2 second reference images, as RG2(i2), i2=1, I2 402-2; and so on, up to an $N^{th}$ reference gallery 640N that can store integer IN $N^{th}$ reference images as RGN(iN), i1=1, IN (collectively "reference galleries 640"). Different ones of the HE mode AI class classifiers of FIG. 6 can be configured according to different AI classifier types and architectures. These can include HE encrypted neural networks, e.g., HE encrypted convolutional neural networks (CNN). The selection of HE encryption type may be based on selection of AI classifier type, as different HE types can enable respectively different arithmetic operations, and different numbers of times the arithmetic operations can be performed.

Figure 7:
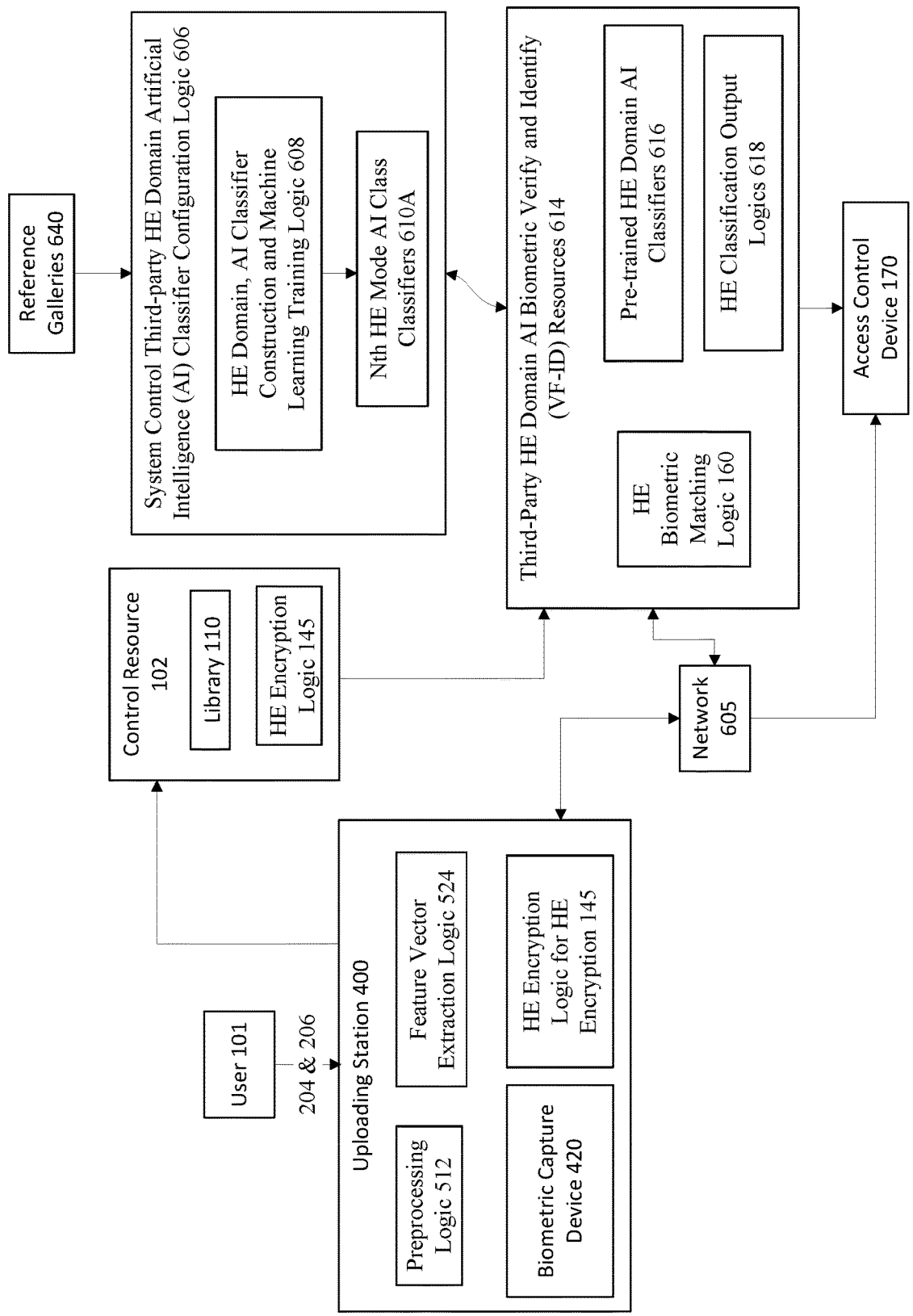
FIG. 7 shows a collective view of FIG. 6.

The system of FIG. 6 may comprise, as third party HE mode computation resources, a first third-party HE domain AI biometric verify and identify (VF-ID) resource 614A, a second third-party HE domain AI biometric VF-ID resource 614B, . . . , and up to an Nth third party HE domain AI biometric VF-ID resource 614N (collectively "third party HE domain AI biometric VF-ID resources 614). The first third-party HE domain AI biometric VF-ID resource 614A may comprise or be configured to interface with a pre-trained HE domain AI classifier 616A and a HE classification output logic 618A. The second third-party HE domain AI biometric VF-ID resource 614B may comprise or be configured to interface with a second pre-trained HE domain AI classifier 616B and a second HE classification output logic 618B. The Nth third-party HE domain AI biometric VF-ID resource 614N may comprise or be configured to interface with a Nth pre-trained HE domain AI classifier 616N and an Nth HE classification output logic 618N. Collectively the pre-trained HE domain AI classifiers 616 are shown in FIG. 7. Collectively, the HE Classification Output Logic 618 are shown in FIG. 7. The system control third-party HE domain AI classifier configuration logic 606 can be configured to selectively upload or otherwise communicate with any of the HE mode AI IN class classifiers 614 to any of the pre-trained HE domain AI classifiers 616. Network 605 may be configured to provide network for facilitating communications between the various components of the system. While shown as separate components, many of the components of the system may be built into a single unit for example, the third-party computer 150 may comprise the First Third-Party HE Domain AI biometric Verify and Identify (VF-ID) Resource 614A.

Also shown in FIG. 6 is uploading station 600A, 600B, and 600N. User 101A, 101B, and 101N may interface with any of these stations. These stations may be connected to the network and other parts of the system. These stations may have similar circuitry and functionality as uploading station 400.

FIG. 7 is similar to FIG. 6 but shows some of the components of FIG. 7 in collective form.

Figure 8:
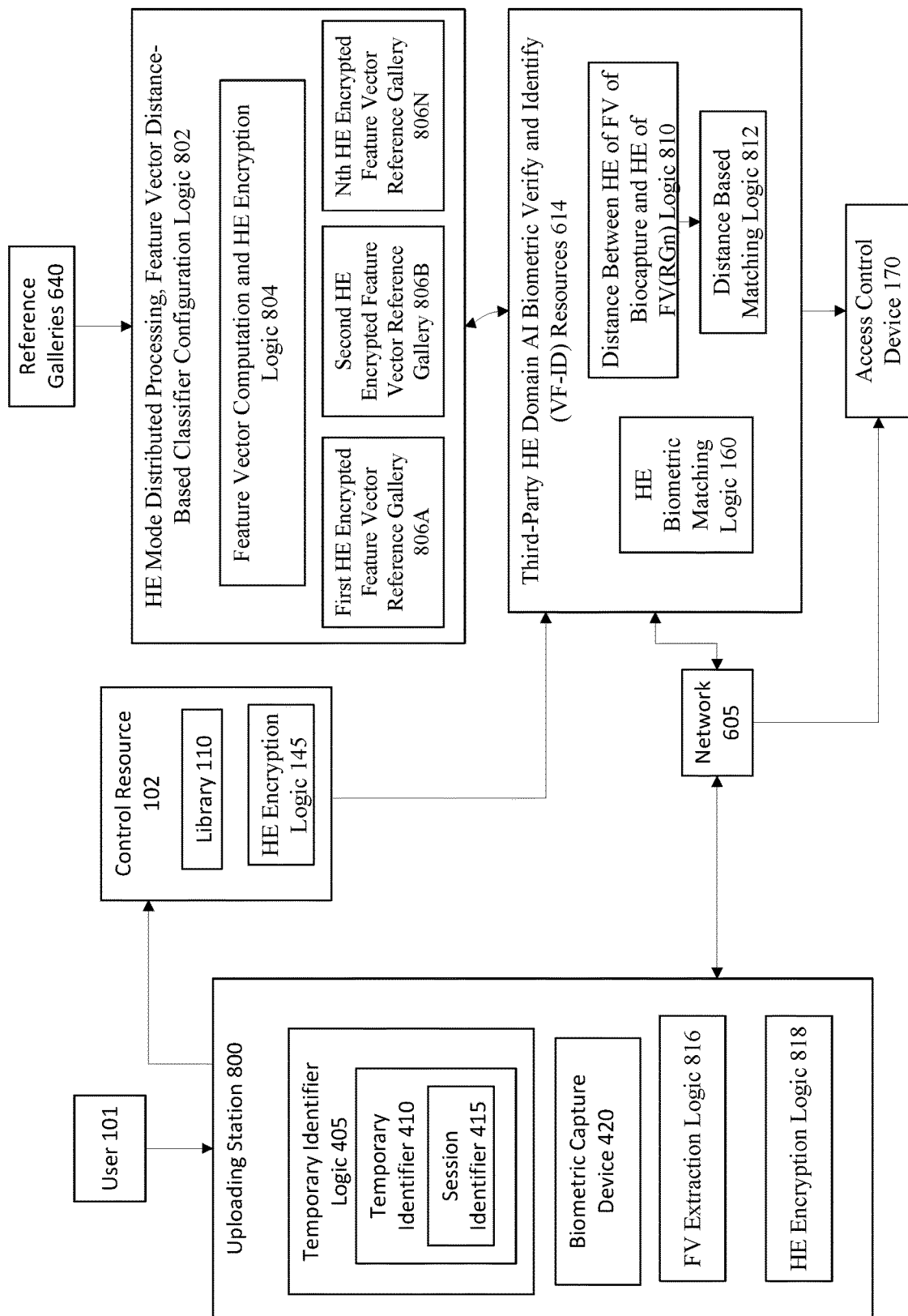
FIG. 8 shows an uploading station, HE mode distributed processing, feature vector distance-based classifier configuration logic, third-party HE domain AI Biometric verify and identity resources, and access control device.

FIG. 8 shows a system comprising an uploading station 800, access control device 170, and a control resource 102. The configuration of FIG. 6 may have the same functionality of the configurations shown in FIGS. 1-7 with the following modifications. The system may include a HE mode distributed processing, feature vector, distance-based classifier configuration logic 802. The HE mode distributed processing, feature vector, distance-based classifier configuration logic 802 can include a feature vector computation and HE encryption logic 804, which may be configured to construct, for any of or for each of the reference galleries 640, a corresponding HE encrypted feature vector reference gallery. Examples include a first HE encrypted feature vector reference gallery 806A, a second HE encrypted feature vector reference gallery 806B, and up to an $N^{th}$ HE encrypted feature vector reference gallery 806N. The feature vector computation and HE encryption logic 504 can be configured to perform, for each $n^{th}$ construction, for in=1 to In, an extracting of FV(RGn(in)) forming→FV(RGn(in)), and a HE encrypting of FV(RGn(in)), forming→HE(FV(RGm(in))). FV=feature vector. RGn=reference gallery n.

The HE mode distributed processing, feature vector, distance-based classifier configuration logic 802 may comprising programming to configure the third-party HE domain AI biometric verify and identify (VF-ID) resources 614. The first third party HE domain biometric VF-ID processing resources 614, can include or can be configured to perform in accordance with a distance between HE of FV of biocapture and HE of FV(RGm) logic and distance based matching logic.

The system of FIG. 8 can include FV configured adaptations of the system of FIG. 4 uploading station 400, such as the example first biometric capture, FV extraction and HE locked uploading station 800. The uploading station may include an FV extraction logic 816, configured to extract FV from the biometric captured BM and generate a corresponding FV(BM) (feature vector biometric information), and can include an HE encryption logic 818 that encrypts FV(BM) as HE encrypted feature vector HE(FV(BM)).

Figure 9:
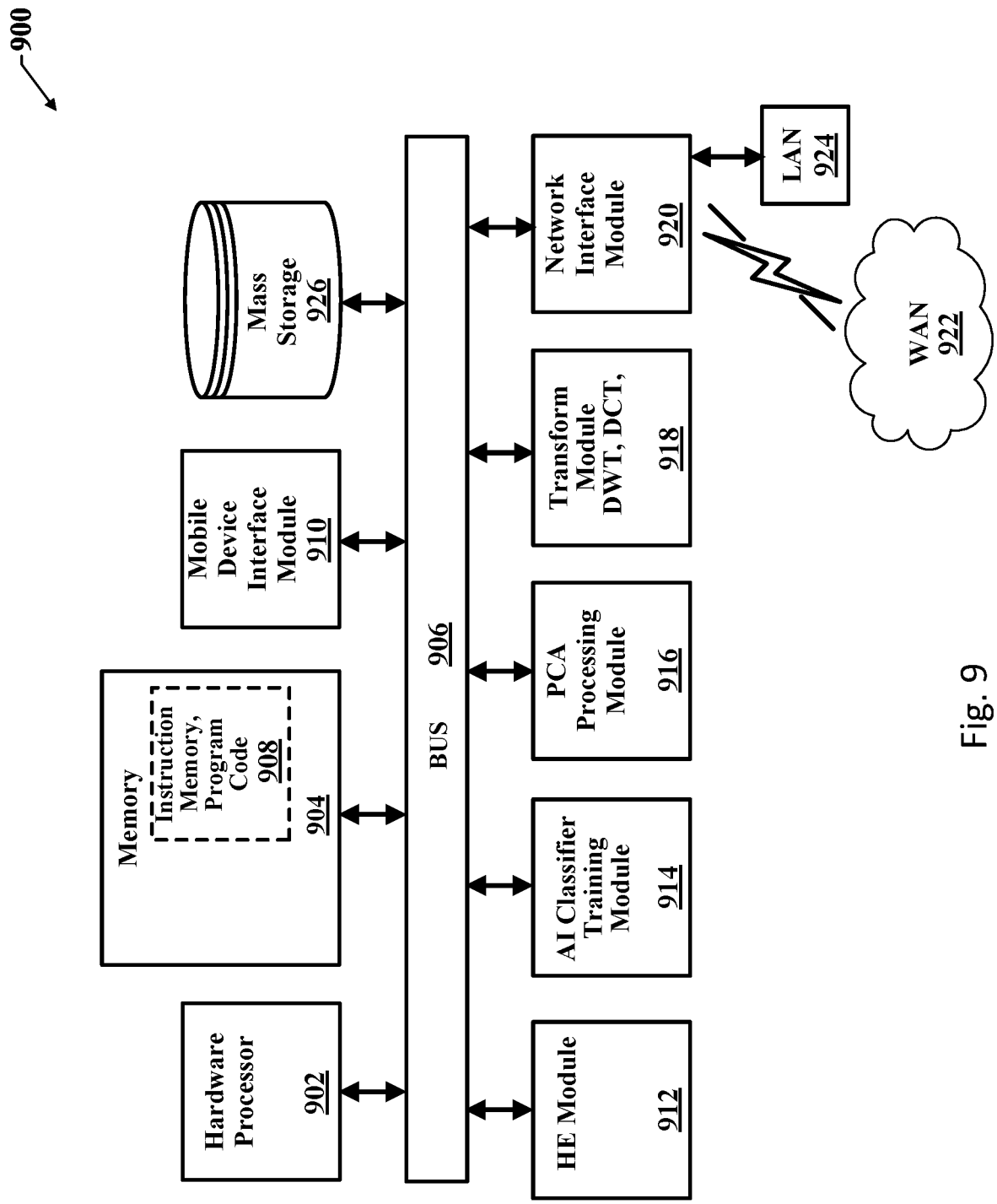
FIG. 9 shows a schematic view of a hardware profile for a computer system.

FIG. 9 shows a simplified functional block schematic of a computer system 900 on which aspects of systems and method in accordance with the present disclosure can be practiced. An implementation of the computer system 900 can include a hardware processor 902 and an instruction memory 908 that can be coupled to one another through a bus 906. Implementations of the hardware processor 902 can include, but are not limited to, ASIC (application-specific integrated circuit), FPGA (field programmable gate array), a generic-array of logic (GAL), and their equivalents. The computer system 900 can include a general memory 904 and a large capacity storage 926, each of which can be coupled, for example, via the bus 906 to the hardware processor 902. It will be understood that the instruction memory 908 and the general memory 904 are logic functions and can be implemented, for example, as respective resources of a shared memory resource.

The instruction memory 908 and general memory 904 can be implemented as computer readable, non-transitory storage media, (e.g., ROM (read-only memory), EPROM (electrically programmable read-only memory), EEPROM (electrically erasable programmable read-only memory), flash memory, static memory, DRAM (dynamic random-access memory), SRAM (static random-access memory).

The hardware processor 902 can be configured to perform a predefined set of basic operations in response to receiving a corresponding basic instruction selected from a predefined native instruction set of codes that can be stored in the instruction memory 908. The predefined native instruction set of codes can include machine codes implementing an application that includes computing, based on the capture biometric image, a biometric information feature vector, such as FV(BM) described above, and can include homomorphically encrypting the biometric feature vector and outputting a corresponding HE encrypted biometric information feature vector, such as HE(FV(BM)) described above. According to various embodiments the application can include communicating the HE encrypted biometric information feature vector to an external processing resource, via the network interface and through the network.

The application can include with the communicating to the external processing resource an indication or instruction to perform a HE domain computation, including a HE domain classifying of the homomorphic encrypted biometric information feature vector, as described above. In reference to FIGS. 1-8, the system can be configured to include maintaining the captured biometric image and the biometric information feature vector not accessible to the external processing resource and receiving from the external processing resource a result of the homomorphic encryption domain classifying.

The computer system 900 can include a mobile device interface module 910, which can implement, for example, the above-described Bluetooth interface between the kiosk 106 and the mobile device 108. The computer system 900 can include an HE module 912 and an AI classifier training module 914. The computer system 900 can also include a PCA processing module 916 and a transform module 918. The transform module 918 can include computer executable instructions that can cause the hardware processor 902 to perform DCT, and Discrete Wavelet Transform (DWTs). The computer system 900 may be coupled, for example, via a network interface module 920, to a network resource such as the WAN (wide area network) 922, such as the Internet and to a local network 924.

FIG. 9 teaches a block schematic of a computer system 900 on which aspects of systems and method in accordance with the present disclosure can be practiced. The control resource 102, scanner 104, kiosk 106, library 110, reference gallery 140, third party computer 150, access control device 170, uploading station 400, classifier 430, and other disclosed devices may be considered their own computer system 900 and may comprise some or all of the hardware described with reference to FIG. 9.

Computer Program Product

The computer system 900 (FIG. 9) may be configured to run or may comprise a computer program or software stored on tangible, non-transitory computer readable. The computer program is an article of manufacture that has a computer-readable medium with executable program code that is adapted to enable a processing system to perform various operations and actions. Stated differently, the executable program code can embody or functionality of instructions that cause a computer, e.g., that cause the processor, to perform particular operations or processes. A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Conclusion

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

In some configurations, kiosk 106 (uploading station 400), Third-Party HE Domain AI Biometric Verify and Identify (VF-ID) Resources 614, and the third-party computer 150 may be configured to implement the process shown in FIGS. 4 and 5 of US Patent Application DHS-0209US01. For example, the uploading station 400 may be configured to perform collision processing 420, FIG. 4, a failover process and exception handling 500, FIG. 5, provide a secondary biographic to biometric verification 426, FIG. 4. The screening area may comprise any of the devices or functionality of the screening area SCA from DHS-0209US01. The access control device 170 as described in this application may be substituted for the e-gate described in DHS-0209US01. Additionally, the Kiosk 106 or Uploading Station from DHS-0208US01 may be embodied as or contain some of the circuitry/functionality of the biometric capture HE Vector Distribution for VFID 202 from DHS-0209US01. Similarly, and by way of illustration—not limitation, third-party computer 150 may comprise some of the functionality or structure of third-party resource 206 of DHS-0209US01. In further example, the HE domain classifier 310 may comprise some or all of the structure or functionality of the HE domain classifier configuring logic 208 of DHS-0209US01.

Although the subject matter has been described in language specific to example structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A method comprising:
   storing homomorphic encrypted (HE) biometric information in a reference gallery;
   providing HE biometric matching logic, and an access control device;
   generating biometric information to store in the reference gallery with a kiosk comprising a scanner;
   scanning a user and generating biometric information for identifying the user; the biometric information comprising an image;
   generating the generated HE encrypted information containing biometric data using an HE encryption algorithm;
   storing HE encrypted biometric information in a library;
   distributing the HE encrypted biometric information to a third-party computer;
   based on the reference gallery, constructing HE encrypted reference information using HE encryption logic;
   the HE Encryption logic storing HE encrypted information in the reference gallery;
   the third-party computer performing a HE biometric matching process using the HE biometric matching logic;
   the HE biometric matching logic performing a matching comparison of the HE encrypted information from the library against HE encrypted biometric information in the reference gallery to identify matching HE encrypted reference information;
   the HE biometric matching logic performing the HE biometric matching process without decrypting or having a capacity to decrypt the HE encrypted information;
   the third-party computer processing biometric information used for biometric matching, without access to underlying biometric information of the user;
   the third-party computer transmitting a message to the access control device;
   the access control device executing an access granted process when the message indicates a positive match based on the matching comparison; and
   the access control device executing an access denied process when the message does not indicate a positive match based on the matching comparison.

2. The method of claim 1 comprising:
   storing a gallery of biometric reference images captured from N different individuals;
      wherein the biometric information is biometric images;
         wherein N is selected from the group of natural numbers and
   storing a gallery of biometric reference images captured from N different individuals in the reference gallery.

3. The method of claim 1 comprising:
   performing the matching comparison using a HE domain arithmetic operator in the HE biometric matching logic; and
   the HE domain arithmetic operator finding a closest match that meets a similarity threshold by using an HE domain vector similarity analysis.

4. The method of claim 1 comprising:
   receiving new HE encrypted facial images; said facial images serving as reference biometric images for each of N verified identity individuals; wherein N is selected from the group of natural numbers;
   encrypting the library with homomorphic encryption (HE) to form a corresponding HE reference library; and
   performing, via exploitations of certain HE encryption features, 1:N classification of the new HE encrypted facial images against the N verified identity individuals.

5. The method of claim 4 wherein each of N verified individuals comprises a homomorphic encrypted reference biometric image.

6. The method of claim 4 comprising:
   the biometric reference gallery storing one or more biometric reference images of one or more biometric types for each of N identities;
   the kiosk receiving N individual library images of N individuals; the N individuals having an identity associated biographic information; and
   a database storing N identities of N users; the kiosk comprising the database; and
   providing secure 1:N classification without decrypting underlying facial images, decrypting the HE encrypted facial images; accessing the N individuals' library images; or accessing the N individuals' identities.

7. The method of claim 6 wherein the matched HE encrypted reference information is a matching HE encrypted reference image.

8. The method of claim 6 comprising the biometric reference gallery storing for each of one or more of the N identities, a plurality of reference images including different capture angles, different lightings, and different facial expressions.

9. The method of claim 6 comprising the biometric reference gallery storing for each of one or more of the N identities, a plurality of reference images including gait or other movement biometrics.

10. The method of claim 9 wherein the reference biometric image includes a visible image pixel array.

11. The method of claim 10 comprising:
    obtaining information characterizing features of the reference biometric image by extracting information from a captured image; and
    the reference gallery storing the characterizing features as an image feature vector.

12. The method of claim 11 wherein the image feature vector includes a principal component analysis (PCA) having an orthogonal linear transformation to transform data into a new coordinate system such that a first greatest variance by scalar projections of related data will lie on a first principal component, and a second greatest variance on a second principal component.

13. The method of claim 11 wherein the image feature vector comprises a reduced dimensionality to conserve memory space.

14. The method of claim 11 comprising:
    a biometric capture device capturing user biometric information; the biometric capture device connected to an uploading station;
    performing HE domain classification on received biometric information from the uploading station;

a classifier selecting a type of HE encryption to program the third-party computer; and an HE encryption logic applying a homomorphic encryption to information captured from the biometric capture device.

15. The method of claim 14 comprising:

an uploading station uploading encrypted biometric information to the third-party computer; and the third-party computer receiving a HE encrypted biometric descriptor from the uploading station.

* * * * *